March 29, 1960  A. R. HOWELL  2,930,544
AIRCRAFT HAVING VERTICAL LIFTING JET ENGINES
Filed Nov. 2, 1955  5 Sheets-Sheet 1

Inventor
ALUN RAYMOND HOWELL
By
Attorneys

March 29, 1960  A. R. HOWELL  2,930,544
AIRCRAFT HAVING VERTICAL LIFTING JET ENGINES
Filed Nov. 2, 1955

Inventor
ALUN RAYMOND HOWELL
By
Attorneys

March 29, 1960 A. R. HOWELL 2,930,544
AIRCRAFT HAVING VERTICAL LIFTING JET ENGINES
Filed Nov. 2, 1955 5 Sheets-Sheet 3

Inventor
ALUN RAYMOND HOWELL
By
Attorneys

March 29, 1960 A. R. HOWELL 2,930,544
AIRCRAFT HAVING VERTICAL LIFTING JET ENGINES
Filed Nov. 2, 1955 5 Sheets-Sheet 4

Inventor
ALUN RAYMOND HOWELL
By
Attorneys

March 29, 1960  A. R. HOWELL  2,930,544
AIRCRAFT HAVING VERTICAL LIFTING JET ENGINES
Filed Nov. 2, 1955  5 Sheets-Sheet 5

Inventor
ALUN RAYMOND HOWELL
By
Attorneys

United States Patent Office 2,930,544
Patented Mar. 29, 1960

2,930,544

AIRCRAFT HAVING VERTICAL LIFTING JET ENGINES

Alun R. Howell, Cove, Farnborough, England, assignor to Minister of Supply, in Her Majesty's Government of the United Kingdom of Great Britain and Northern Ireland, London, England Application November 2, 1955, Serial No. 544,457

7 Claims. (Cl. 244—12)

This invention relates to aircraft, and particularly though not exclusively to aircraft designed for very high speed flight, e.g. at supersonic speeds. Such aircraft normally have a high wing loading and hence very long take-off and landing runs are necessary. To shorten the landing and take-off runs, it is desirable to make provision for imparting an upwardly directed component of thrust to the aircraft in addition to the aerodynamic lift afforded by the wings.

The invention is also applicable to comparatively low speed lightweight aircraft in which it is desired to achieve substantially vertical take-off and landing.

The high thrust developed by modern gas turbine jet propulsion engines opens the possibility of providing a vertical lift engine giving a vertically upwardly directed thrust equal to or greater than the weight of the aircraft and so vertical or nearly vertical take-off and landing may become possible, the take-off and landing runs being curtailed and possibly eliminated.

Such a gas turbine engine for vertical lift is only required to be brought into use for quite short periods of time, and accordingly it must be of light a weight as possible. Further, since the engine may be mounted in the aircraft wing with its axis generally vertical, it is desirable that it shall have minimum axial length.

These requirements are best met by the use of a ducted fan type gas turbine jet propulsion engine. Accordingly the invention provides an aircraft having a ducted fan type gas turbine jet propulsion engine mounted therein and arranged to discharge a propulsive jet stream downwardly so as to produce an upwardly directed component of thrust on the aircraft.

By a ducted fan type gas turbine jet propulsion engine is meant one including a main gas turbine unit comprising a compressor, a combustion system and a turbine driving the compressor and discharging the exhaust gases as a propulsive jet stream and having in addition ducted fan blading driven by the stream of working fluid passing through the main engine and operating in a duct to draw in air and to discharge it as a propulsive jet stream in parallel with the exhaust gas stream from the turbine. Various forms of ducted fan may be used. In one form the engine comprises an additional mechanically independent rotor mounted downstream of the turbine rotor and carrying the ducted fan blades, and also carrying turbine rotor blades driven by the exhaust gases from the compressor-driving turbine. An example of such an engine is shown in British patent specification No. 587,571. In the preferred form of the invention however the ducted fan blades are mounted on a turbine rotor which is rotatable mechanically independently of the compressor-driving turbine rotor, and which carries turbine rotor blades which are driven by the combustion gases from the combustion system and which serve as rotating inlet nozzle vanes for the rotor blades of the compressor-driving turbine rotor. Examples of such a plant are described in British patent specifications Nos. 587,528 (Fig. 2) and 632,568 in which the ducted fan rotor is itself located upstream of the compressor-driving turbine rotor.

It can be shown that, for a given thrust, a ducted fan type gas turbine jet propulsion engine is lighter than the corresponding "simple" plant in which the whole thrust is derived from the exhaust gas stream from the turbine. Further a ducted fan type engine is more efficient at low forward speeds than a "simple" engine, and hence is inherently suitable for the comparatively low vertical speeds of the aircraft. These advantages are realised to the greatest extent by the use of the preferred form of ducted fan engine referred to above.

The advantages are of course gained at the expense of increased frontal area of the engine, but in the particular application with which this invention is concerned, this advantage is not very significant.

Another feature of the invention is that provision is made for increasing the velocity of the stream of air from the ducted fan, so that its velocity is more nearly equal to the velocity of the stream of exhaust gases from the turbine.

The invention will now be more fully described by way of example with reference to the accompanying diagrammatic drawings, of which:

Figure 1:
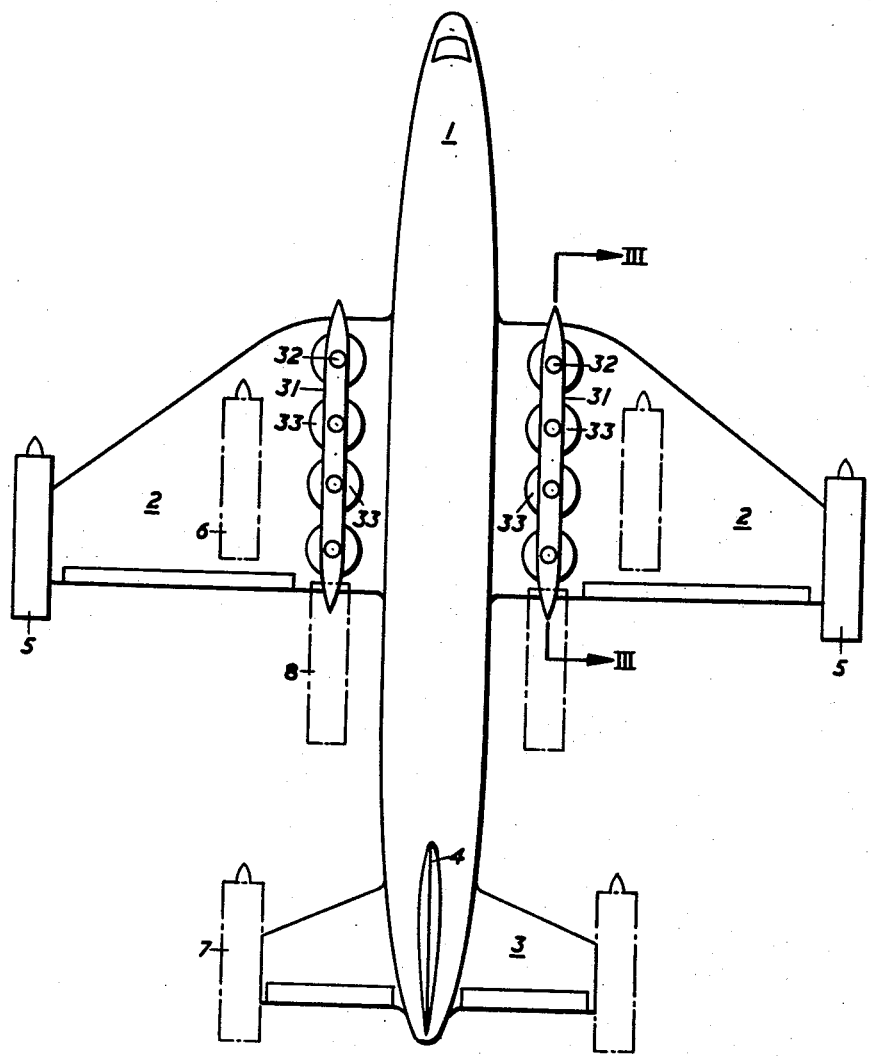
Figure 1 is a plan view of an aircraft.
Figure 2:
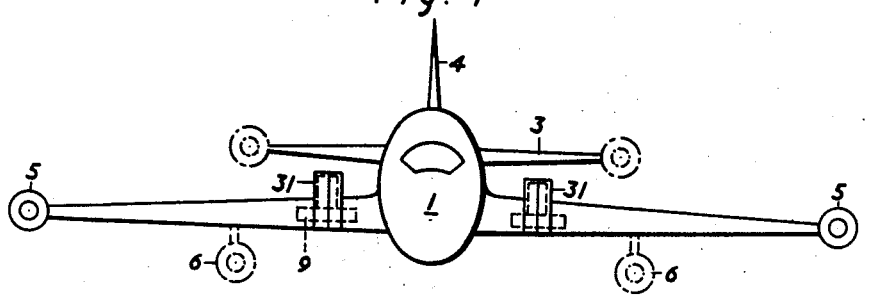
Figure 2 is a frontal view of the aircraft shown in Figure 1.

In Figures 1 and 2, an aircraft comprises a fuselage 1, wings 2, tailplane 3 and fin 4, and is powered for forward flight by two gas turbine jet propulsion engines 5 mounted in "pods" at the wing tips. The engines may alternatively be mounted in pods under the wings, at the tips of the tailplane, or behind the wing as indicated in dotted lines at 6, 7 and 8 respectively.

In addition, the aircraft is provided with eight vertical lift engines 9 which are gas turbine jet propulsion engines of the ducted fan type. Four engines are mounted in each wing, with their axes substantially vertical and lying in fore and aft planes symmetrically disposed on each side of the fore and aft centre line of the aircraft, the arrangement being such that the resultant line of action of the engines passes through the centre of gravity of the aircraft. The construction of these engnies is shown diagrammatically in Figure 4. Each engine comprises a multistage axial flow compressor C, a combustion system comprising an annular aircasting 11 enclosing an annular flame tube 12 and a turbine T. The turbine comprises a turbine rotor 13 drivingly connected to the compressor rotor 14 by a shaft 15 supported in bearings 16, 17, and a second turbine rotor 18 mounted upstream of rotor 13 on a stub shaft 19 supported in bearings 20, 21. The rotor 18 is free to contra-rotate with respect to the rotor 13 and carries rotor blades 18a which constitute moving turbine nozzle vanes for the rotor blades 13a carried on rotor 13. The combustion gases from the combustion system are discharged directly into the blades 18a, no fixed nozzle vanes being provided.

Mounted on the tips of the blades 18a is an annular support member 22 which extends downstream around the outside of the blades 13a and carries a further row of turbine rotor blades 23 downstream thereof. In some cases these blades 23 may be omitted. The support member 22 carries on its outer surface a row of ducted fan rotor blades 24 which operate in a duct 25 coaxially surrounding the turbine, the outer wall 26 of the duct being supported from the annular aircasing 11 by struts 27 extending radially across the inlet to the duct 25 and carrying a row of stator blades 28 downstream of the ducted fan rotor blades 24.

It will be understood that in operation a propulsive jet stream of exhaust gases is discharged from the turbine and a propulsive jet stream of air is discharged from the ducted fan in parallel therewith. The stator blades 28 may be shaped to accelerate the air stream from the ducted fan so that its velocity more nearly matches that of the stream of hot gases from the turbine.

Figure 3:
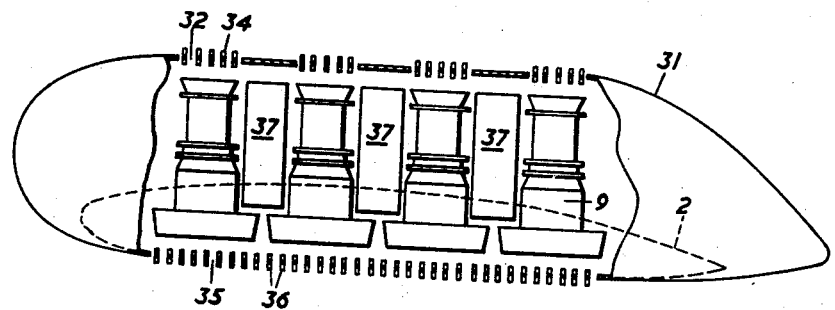
Figure 3 is a sectional view taken on the line III—III in Figure 1.

The engines just described are mounted in the wing 2 of the aircraft with their axes substantially vertical and with their ducted fan ends lowermost. The ducted fan ends of the engines lie within the profile of the wing 2 as indicated in Figures 2 and 3, but the compressor ends extend above the wing upper surface and are enclosed by a streamlined nacelle 31, the ducted fans extending within the wing on each side of the nacelle. The upper surface of each nacelle is formed with four apertures 32 leading to the inlets of the compressor C, while the upper surface of the wing is formed with four apertures 33 on each side of the nacelle leading to the ducted fan inlets. The sides of the nacelle may be recessed around these apertures 33 to afford inlets which together extend around the whole flow area of the ducted fans. However, if this is not practical or desirable from structural considerations, it is possible to have partial admission inlets, i.e. inlets which do not extend around the whole flow area.

The apertures 32 in the upper surface of the nacelle are provided with pivotally mounted vanes 34 extending transversely with respect to the direction of flight of the aircraft, and similar vanes are provided for the apertures 33. When the ducted fan engines are in operation for takeoff, landing or hovering flight, the vanes are turned to a vertical position so that they lie edge on to the air flow to the engine as shown in Figure 3. In normal forward flight, the vanes are turned so that they close the apertures 32, 33.

The propulsive gas and air streams from the vertical lift engines 9 in each wing are discharged vertically downwardly through an elongated aperture 35 in the undersurface of each wing, thereby producing an upwardly directed component of thrust on the aircraft. The aperture is provided with pivotally mounted vanes 36 in the same way as the apertures 32, 33 so that it can be closed when the ducted fan engines are not in use.

Figure 4:
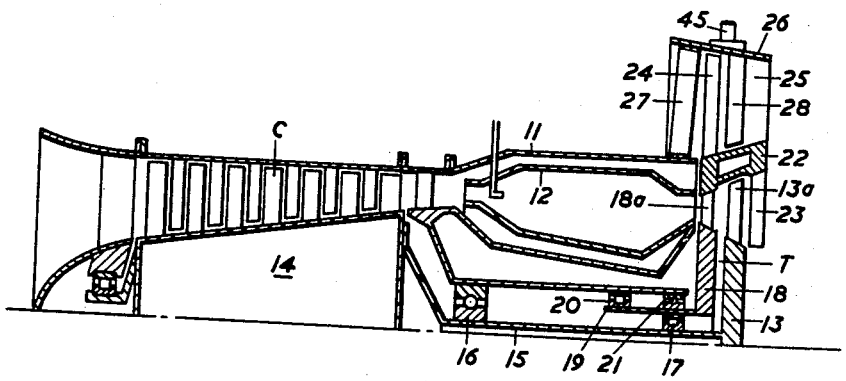
Figure 4 is a half-sectional view of a gas turbine jet propulsion engine of the ducted fan type.

It will be seen from Figure 4 that the turbine and the ducted fan of the engine discharge direct to atmosphere and no exhaust ducts or jet pipes are provided. The turbine blades 23 and the ducted fan stator blades 28 are thus close to the discharge aperture 35 and lie only just inside the wing. This arrangement is possible because the vertical speed of the aircraft, i.e. the speed axially of the engine, is fairly small, and so the losses arising from the presence of the "dead" area rearwardly of the turbine rotor 13 and radially within the annular exhaust gas stream discharged therefrom will not be very large.

It will be understood that other types of ducted fan engines could be used. In a variant of the preferred form of engine referred to above, the turbine rotor driving the ducted fan blades is mounted on a bearing downstream of the compressor-driving turbine and carries a row of turbine rotor blades lying downstream of the blades of the compressor-driving turbine and an annular support member mounted on the turbine blade tips and extending upstream therefrom. The support member carries on its outer surface the ducted fan rotor blades and on its inner surface an additional row of turbine blades acting as nozzle vanes for the blades of the compressor-driving turbine rotor.

As shown in Figure 3, the spaces between the compressor ends of the engines 9 are utilized for fuel tanks 37.

Figure 6:
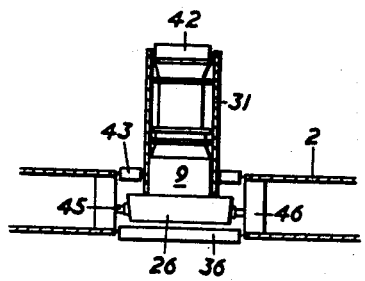
Figure 6 is a sectional view taken on the line VI—VI in Figure 5.
Figure 5:
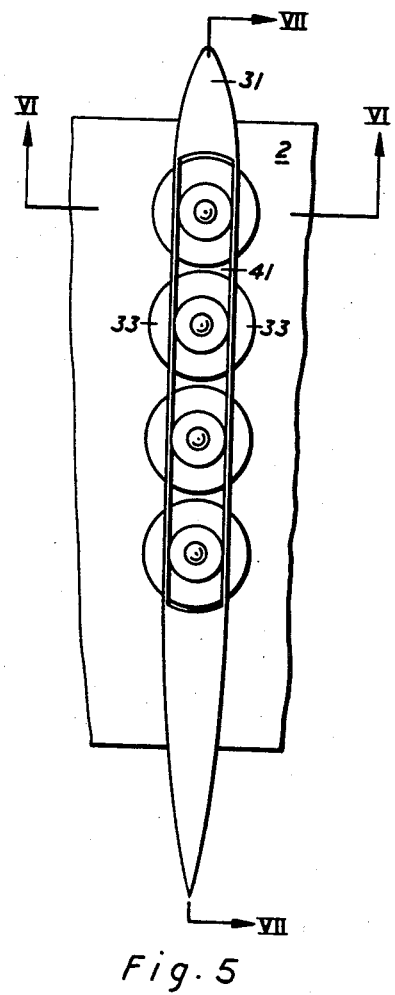
Figure 5 is a plan view of part of the wing of another aircraft.
Figure 7:
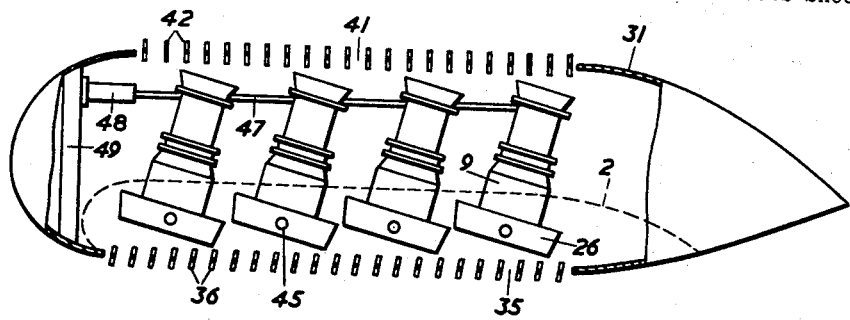
Figure 7 is a sectional view taken on the line VII—VII in Figure 5.

Figures 5, 6, 7 show the nacelle 31 of an aircraft similar to that already described, but in this arrangement, the individual apertures 32 in the top of the nacelle are replaced by a single elongated aperture 41. Air for the compressor of the engines 9, which are as shown in Figure 4, enters through aperture 41 while air for the ducted fan enters through apertures 41 and 33. Thus there is full admission to the ducted fans. In this embodiment it will not be possible to use the space between the engines for the fuel tanks.

As shown in Figures 6 and 7 the aperture 41 is provided with pivoted vanes 42 and the apertures 33 are provided with vanes 43.

In this embodiment, the engines 9 are pivotally mounted on horizontal axes extending transversely with respect to the fore and aft centre line of the aircraft. Mounted on diametrically opposite sides of the outer wall 26 of the ducted fan are trunnion bosses 45 consisting of cylindrical journals supported in bearings in chordwise extending structural members 46 of the wing 2. The engines can be swung in the bearings from a position in which their axes are substantially vertical to one in which their axes are inclined to the vertical, and the propulsive jet streams are discharged forwardly with respect to the direction of flight of the aircraft. The engines 9 are shown in this position in Figure 7.

For take-off, the vertical lift engines are operated with their axes vertical so that the aircraft rises vertically. The main engines 5 can then be started up and when the aircraft has attained sufficient height and forward speed, the vertical lift engines 9 can be shut down. For landing, the vertical lift engines 9 are swung to the position shown in Figure 7, say, through an angle of 20 or 30°, so that they can give a component of thrust producing a reaction component in the rearward direction, i.e. against the direction of flight, as well as upwardly. The forward speed of the aircraft is thus reduced until it has little or no forward speed, i.e. until it is hovering, when the engines 5 can be shut down and the vertical lift engines swung to the vertical position. The aircraft can then land vertically, supported solely by the thrust of the vertical lift engines.

The forward speed of the aircraft may alternatively or in addition be reduced by the use of thrust reversers associated with the forward propulsion engines 5.

The swinging of the engines 9 is effected by a link 47 connected to their compressor ends and operated by a hydraulic jack 48 anchored to a bulkhead 49 in the nacelle. When the engines 9 are set at angle, the vanes 36 in the aperture 35 in the lower surface of the wing are set at an angle corresponding to the direction of the propulsive jet streams, i.e. they lie edge on to the jet stream, and when the engines are swung to the vertical position, the vanes are similarly turned to the vertical position.

Since the outer walls 26 of the ducted fans of the engines taper rearwardly, the engines can be mounted quite close together with the upstream ends of the walls 26 almost touching without their interfering with one another when they are swung from the vertical.

Figure 8:
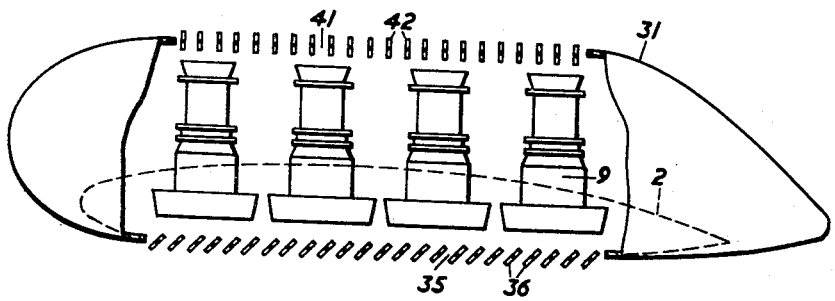
Figures 8 and 9 are diagrammatic sectional views corresponding to Figures 3 and 7, showing some further modifications of the invention.

If it is not desired to pivotally mount the engines 9, the propulsive jet stream may be directed forwardly by the vanes 36 alone. This arrangement is shown in Figure 8. Alternatively the jet stream may be diverted partly by swinging the engines 9 and partly by use of the vanes.

Figure 9:
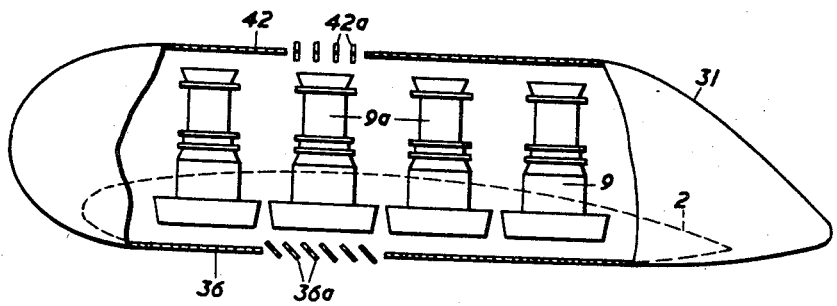

The embodiment of Figure 9 shows an arrangement in which one of the vertical lift engines is used for giving forward thrust. For forward flight, all the vertical lift engines except one, e.g. the second from the front indicated at 9a, are shut down and all the vanes 42 in the upper surface are turned to the closed position except those indicated at 42a. Similarly all the vanes 36 are turned to the closed position except those indicated at 36a which are set to direct the jet stream with a rearward component so as to produce a forward component of thrust on the aircraft. In addition, if the engine 9a is pivotally mounted in manner described above, it may be swung to a position in which the jet stream is discharged to give a forward component of thrust.

In some cases more than one of the vertical lift engines can be used to give forward thrust.

In yet another embodiment, the vertical lift engines may be mounted with their axes permanently inclined to the vertical. The vanes in the apertures in the lower surface of the aircraft can be pivoted to direct the jet stream downwardly, forwardly or rearwardly as desired. This arrangement is suitable for use in an aircraft in which the vertical lift engines are also to be used for forward flight. Thus the engines may be mounted with their axes inclined at an angle of 30° to the vertical, their jet streams being discharged with a rearward component of motion relative to the direction of flight and the vanes may be pivoted so that they can deflect the jet streams through 30° on each side of the axes of the engines, that is, either vertically downwardly for take-off and landing, or rearwardly at an angle of 60° to the vertical for forward flight.

Figure 10:
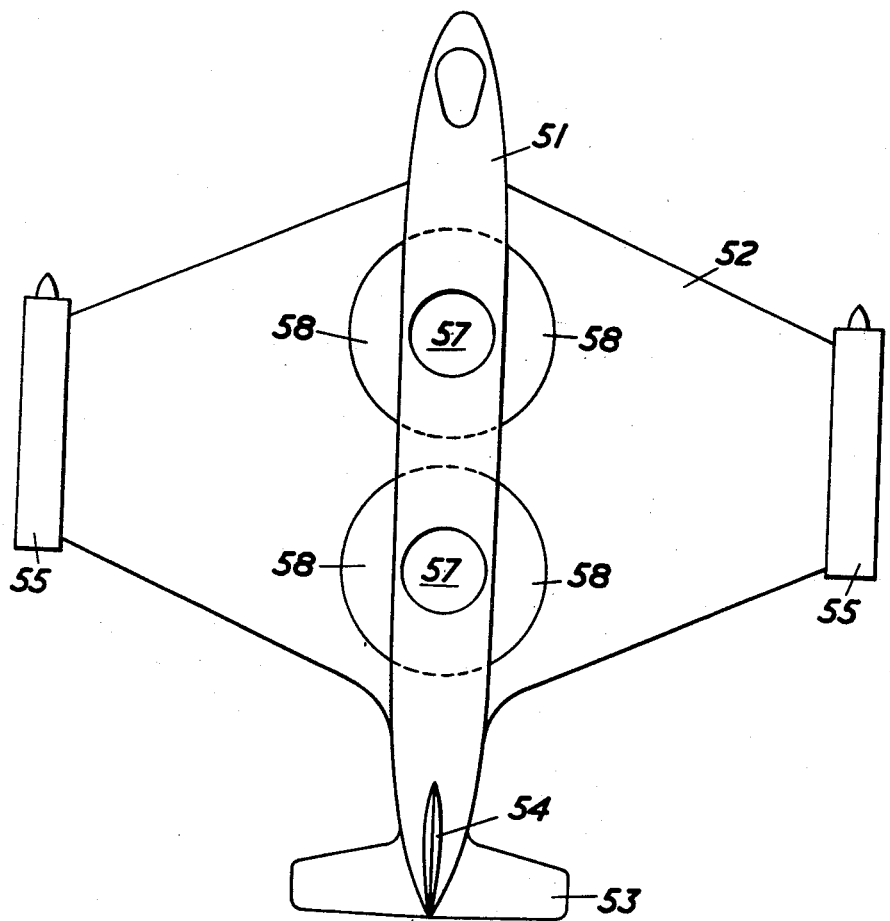
Figure 10 is a plan view of yet another aircraft.
Figure 11:
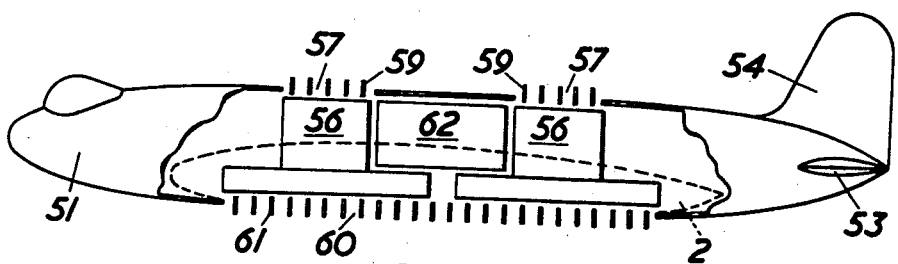
Figure 11 is a side view of the aircraft shown in Figure 10, one wing and the side of the fuselage being shown as broken away.

Figures 10 and 11 show an aircraft comprising a fuselage 51, wings 52, tailplane 53 and fin 54, and provided with gas turbine jet propulsion engines 55 for forward flight mounted at the wing tips as in the previously described embodiments. The aircraft is further provided with two vertical lift jet propulsion engines of the ducted fan type as previously described, these engines being indicated diagramatically at 56. The engines are mounted with their axes vertical on the aircraft centre line and symmetrically disposed with respect to the centre of gravity of the aircraft, their compressor ends being accommodated within the fuselage 51 and their ducted fan ends extending into the wings 2 on each side of the fuselage and lying within the wing profile. Inlets 57 to the compressors are provided in the top of the fuselage and further inlets 58 to the ducted fans are provided in the upper surface of the wings on each side of the fuselage. These inlets correspond to the inlets in and on each side of nacelles in the previously described embodiments, and are provided with pivotable vanes 59 in a like manner. The engines discharge through an aperture 60 in the lower surface of the aircraft, this aperture also being provided with pivotable vanes 61. As in Figure 3, the space between the compressors of the engines 56 is used for a fuel tank 62.

The main engine or engines for forward flight may of course be mounted elsewhere in the aircraft, e.g. in the fuselage rearwardly of the vertical lift engines.

Since the vertical lift engines are only in use for very short periods of time, say, a few minutes of each flight, a comparatively short engine life can be accepted and a very light weight construction used. In the embodiment of Figure 9, however, the engine 9a used for forward flight must be designed to have a much longer life than the other engines.

In all the above described embodiments, the vertical lift engines are accommodate partly within the wing and partly in a streamline body such as a nacelle or fuselage above the upper surface of the wing. In some cases, e.g. in a very large sized aircraft, it may be possible to accommodate the vertical lift engines wholly within the wings or fuselage.

I claim:

1. An aircraft comprising a wing and a gas turbine jet propulsion engine, said engine comprising a compressor having a rotor and a turbine for discharging a propulsive jet stream, said turbine having a first turbine rotor adjacent its discharge end, a shaft connecting said first turbine rotor to said compressor rotor, a second turbine rotor adjacent said first turbine rotor and means mounting said second turbine rotor for contra-rotation with respect to said first turbine rotor, means defining an annular duct enclosing said turbine, a row of ducted fan blades mounted on the periphery of said second rotor and operating in said duct to draw in air and discharge it as a further propulsive stream, said engine being mounted in the wing of the aircraft with the discharge end of said turbine adjacent the lower surface of the wing and the compressor projecting above the upper surface of said wing, apertures in the lower surface of said wing for allowing discharge of the propulsive jet streams from said turbine and duct, control means in said wing for controlling the direction of discharge of said propulsive jet streams, air inlet apertures in the upper surface of said wing communicating with said duct, and a streamlined body enclosing said compressor, said body having an air inlet aperture communicating with said compressor.

2. An aircraft according to claim 1 wherein said control means comprises pivotally mounted vanes extending transversely across said apertures in the lower surface of said wing, said vanes being pivotable between a position in which they close said apertures to one in which they lie edge on to the air flow through said apertures.

3. An aircraft according to claim 1 wherein said control means comprises means pivotally mounting the engine whereby said engine may be pivoted about a horizontal axis extending transversely with respect to the direction of flight of the aircraft from a position with its axis vertical with the jet stream discharging vertically downwardly to a position with its axis inclined to the vertical with the jet stream discharging with a component of motion relative to the direction of flight of the aircraft.

4. An aircraft comprising a wing, a fuselage, and a gas turbine jet propulsion engine, said engine comprising a compressor having a rotor; a turbine for discharging a propulsive jet stream, said turbine having a first turbine rotor adjacent its discharge end connected by a shaft to the compressor rotor, a second turbine rotor adjacent said first turbine rotor and means mounting said second turbine rotor for contra-rotation with respect to said first turbine rotor; means defining an annular duct enclosing the turbine; and a row of ducted fan rotor blades mounted on the periphery of said second rotor and operating in said duct to draw in air and to discharge it as a further propulsive jet stream; said engine being mounted in the aircraft with the discharge end of said turbine lowermost, at least part of said duct lying within the profile of the wing, the aircraft having apertures in its lower surface for the downward discharge of said propulsive jet streams so as to produce an upwardly directed component of thrust on the aircraft, control means in said aircraft for controlling the discharge direction of said propulsive jet streams, air inlet apertures in the upper surface of said wing communicating with said duct, and air inlet apertures in the upper surface of said aircraft communicating with said compressor.

5. An aircraft as claimed in claim 4 wherein said turbine and compressor lie within the fuselage of said aircraft.

6. An aircraft according to claim 5 wherein said control means comprises means pivotally mounting the engine whereby said engine may be pivoted about a horizontal axis extending transversely with respect to the direction of flight of the aircraft from a position with its axis vertical with the jet stream discharging vertically downwardly to a position with its axis inclined to the vertical with the jet stream discharging with a component of motion relative to the direction of flight of the aircraft.

7. An aircraft as claimed in claim 5 wherein said control means comprises pivotally mounted vanes extending transversely across the apertures in the lower surface of said aircraft, said vanes being pivotable between a position in which they close said apertures to one in which they lie edge on to the air flow through said apertures.

References Cited in the file of this patent

UNITED STATES PATENTS

| | | |
|---|---|---|
| 1,921,043 | Roth | Aug. 8, 1933 |
| 2,463,352 | Broluska | Mar. 1, 1949 |
| 2,502,045 | Johnson | Mar. 28, 1950 |
| 2,567,392 | Naught | Sept. 11, 1951 |
| 2,610,005 | Price | Sept. 9, 1952 |
| 2,620,624 | Wislicenus | Dec. 9, 1952 |
| 2,734,699 | Lippisch | Feb. 14, 1956 |
| 2,777,649 | Williams | Jan. 15, 1957 |

FOREIGN PATENTS

| | | |
|---|---|---|
| 506,664 | Belgium | May 21, 1954 |
| 903,462 | France | Jan. 15, 1945 |
| 1,068,404 | France | Feb. 3, 1954 |
| 588,096 | Great Britain | May 14, 1947 |